Aug. 22, 1950  S. L. KING  2,519,478
PORTABLE TRUCK ELEVATOR
Filed June 20, 1946  2 Sheets-Sheet 1
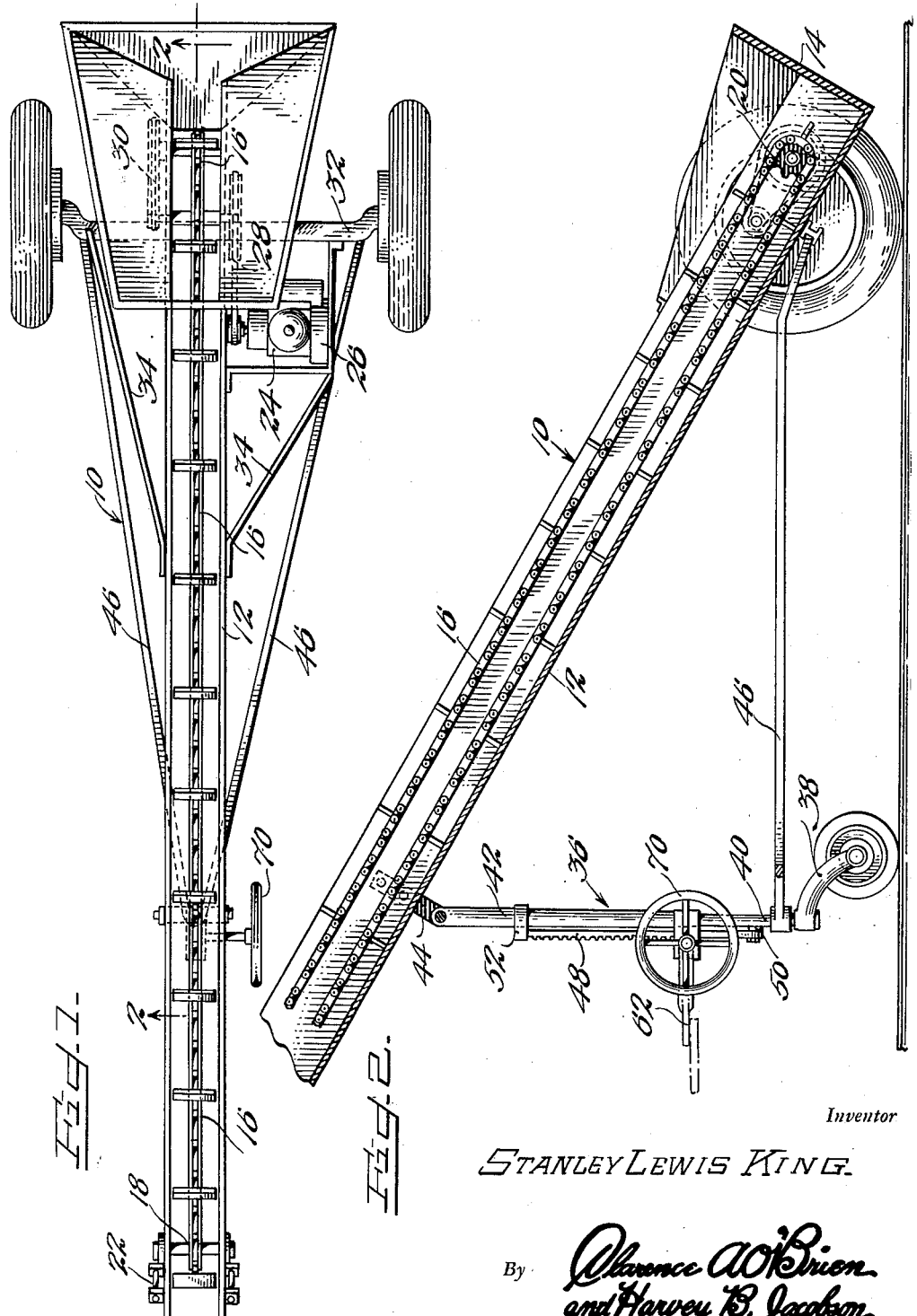
Inventor
STANLEY LEWIS KING.
By Clarence A. O'Brien
and Harvey B. Jacobson
Attorneys

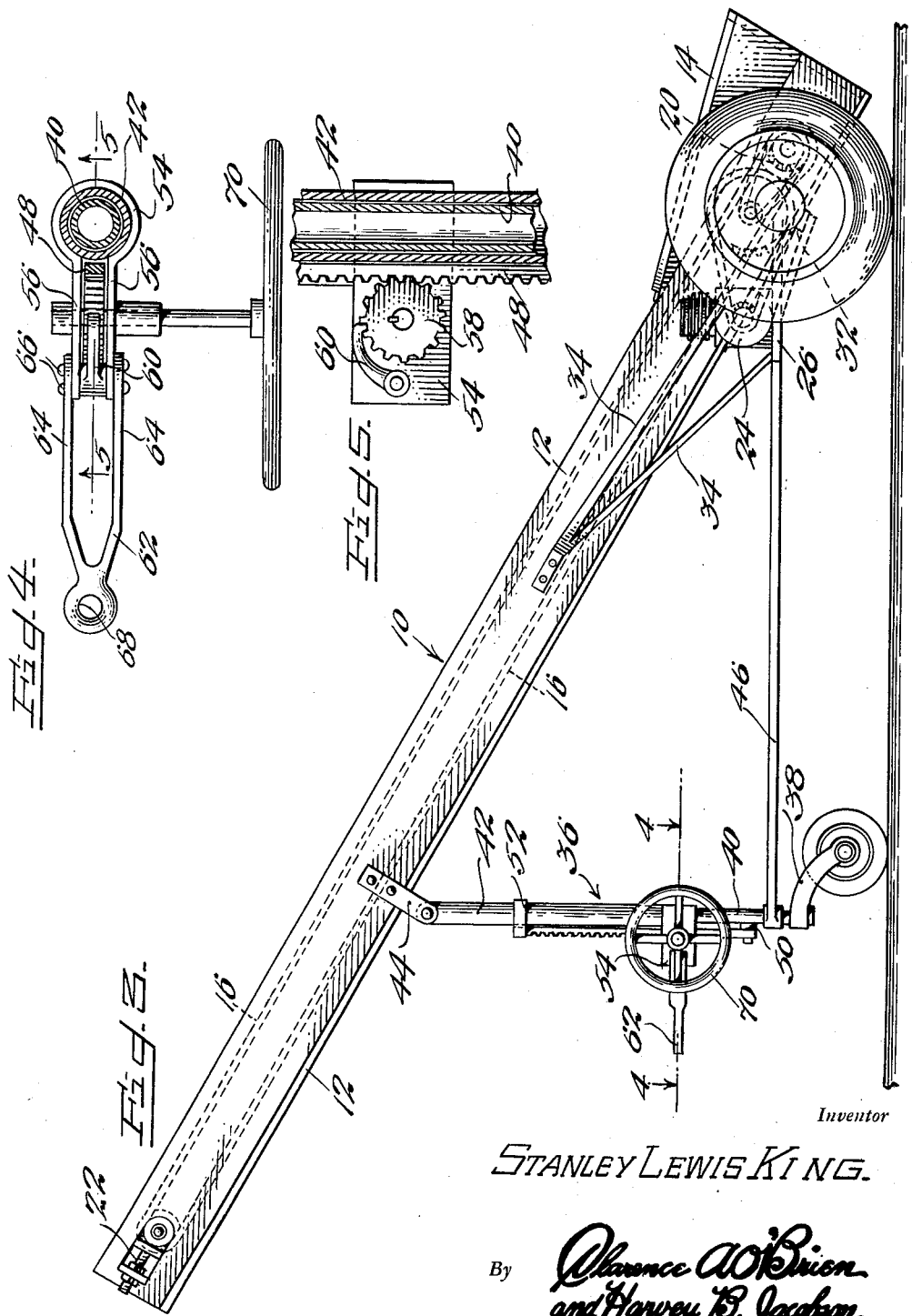

Patented Aug. 22, 1950

2,519,478

UNITED STATES PATENT OFFICE 2,519,478

PORTABLE TRUCK ELEVATOR

Stanley Lewis King, Charles City, Iowa

Application June 20, 1946, Serial No. 678,052

3 Claims. (Cl. 198—233)

This invention pertains to novel and useful improvements in a portable truck elevator and more especially has reference to an adjustable power elevator for handling articles or the like when shifting them from one elevation to another.

The primary object of my invention resides in the construction of a portable elevating device which is adapted for ready portability and adjustment to any desired height, which shall have an improved height adjusting means and which shall be particularly efficient for the purpose intended.

This, together with numerous other objects of the invention which will later become apparent as the following description proceeds are attained by my device, one embodiment of which has been illustrated by way of example only, in the attached drawings, wherein:

Figure 1 is a top plan view of the device;

Figure 2 is a side elevational view of the device, parts being broken away to show the construction thereof;

Figure 3 is a side elevational view of the device;

Figure 4 is a top plan view taken upon the horizontal section line 4—4 of Figure 3; and Figure 5 is a vertical sectional detail view taken substantially upon the line 5—5 of Figure 4.

Referring first to Figures 1 and 2 of the attached drawings, the numeral 10 denotes generally my improved portable truck elevator which consists of a channel or frame member 12 terminating at one end in a hopper member 14 and having a conventional type of chain conveyor 16 suitably supported and mounted therein as by means of sprockets 18 and 20. The sprocket 18 is provided with a suitable slack take-up device indicated at 22 while the sprocket 20 is driven at any desired gear ratio by the power plant 24 mounted upon a bracket 26 carried by the frame 12, and operatively associated with the sprocket 20 as by the chain drives indicated at 28 and 30 in Figure 1. The hopper end of the frame 12 is carried upon a wheeled support or axle 32 from which suitable braces 34 extend to and are engaged with the frame 12.

At any convenient point, but preferably substantially intermediate its ends, the frame 12 has pivoted thereto an adjustable wheeled support means indicated generally at 36. This last named means consists of a caster wheel 38 having a vertically extending axle 40. This axle extends slidably in a depending tubular rod 42 which is pivoted to a bracket 44 secured to the frame 12 intermediate its length as above set forth. Adjacent the lower end of the axle 40 are journaled as by a securing collar a pair of reinforcing members 46 whose other ends are secured to the wheel support 32. These latter members constitute reinforcing means for rigidly bracing the adjustable support 36 in relation to the frame 12 and to the wheel support 32. A vertically disposed rack bar 48 is arranged in parallelism with the axle 40 and the tubular member 42, and has its lower portion rigidly secured to the axle 40 as at 50. As may be clearly seen by reference to Figure 5 of the drawings, the rack bar 48 is spaced from axle 40 a sufficient distance to accommodate the sliding movement of the tubular member 42 downwardly upon the axle 40. At its upper end, the rack 48 has integrally or rigidly secured therewith a collar or clamp 52 which encircles loosely the tubular member 42 in slidable and guided relation thereon. Adjacent its lower extremity, the tubular member 42 is formed with a rigidly secured or integral bracket 54 which bracket has bifurcated arms 56 journalling therein a pinion 58 adapted to constantly engage the rack 48. A dog 60 is also pivoted between the bifurcations 56 of the bracket 54 for engagement with the pinion 58 in order to lock or latch the members 42 and 40 in a predetermined extended position. A yoke 62 having parallel bifurcations 64 rigidly attached to the bifurcations 56 as at 66, is formed with an eye 68 adapted to be engaged by a pulling connection from a truck or the like in order to facilitate towing and transporting the device.

From the foregoing explanation it is believed that the operation of my device will be now apparent. By means of the swivelling connection 68, the elevator may be towed or otherwise transported to any desired location, whereupon by proper manipulation of the hand wheel 70, the attached pinion 58 and the engaged rack 48 can be actuated to extend or retract the telescoping members 42 and 40 and thereby arrange the frame 12 and the elevator 16 at any desired inclination. As will be apparent, this device will assist and facilitate in handling loads of material for elevating and lowering the same with a minimum of manual labor. Moreover, the device may be set at any desired position or angle in order to expeditiously load and unload materials.

Since it will be evident that various structural arrangements may be employed to carry out the function and purposes of the invention, I do not limit myself to the exact construction shown, but may employ any suitable modifications falling within the scope of the appended claims.

I claim as my invention:

1. A portable elevator comprising a frame having an elevator and a hopper supported thereon, wheeled support means for one end of said frame, an adjustable wheeled support pivoted to said frame, brace means connected with said adjustable wheeled support and said wheeled support means, said adjustable wheeled support including an upper member pivoted to said frame, a lower member telescoped with said upper member and having a caster thereon, and means for adjusting the effective length of said upper and lower members to vary the inclination of said elevator, said means including a rack secured to said lower member and spaced from said upper member, a collar on said rack loosely riding on said upper member, a bifurcated clamp mounted on said upper member, a pinion supported in said clamp and engaging said rack, and means to operate said pinion.

2. The combination of claim 1 wherein said clamp includes a yoke member for attachment to a vehicle.

3. A portable elevator comprising a frame having an elevator and a hopper supported thereon, wheeled support means for one end of said frame, an adjustable wheeled support pivoted to said frame, brace means connected with said adjustable wheeled support and said wheeled support means, said adjustable wheeled support including an upper member pivoted to said frame, a lower member telescoped with said upper member and having a caster thereon, and means for adjusting the effective length of said upper and lower members to vary the inclination of said elevator, said means including a rack secured to said lower member and spaced from said upper member, a collar on said rack loosely riding on said upper member, a bifurcated clamp mounted on said upper member, a pinion supported in said clamp and engaging said rack, and means to operate said pinion and a pawl for locking said rack in selected position.

STANLEY LEWIS KING.

REFERENCES CITED

The following references are of record in the file of this patent:

UNITED STATES PATENTS

| Number | Name | Date |
|---|---|---|
| 1,673,559 | Hanak | June 12, 1928 |
| 2,343,444 | Coon | Mar. 7, 1944 |
| 2,390,286 | Adams | Dec. 4, 1945 |